9393X
J. K. Smith,
Car-Door Bolt.
Patented Feb. 12. 1836.
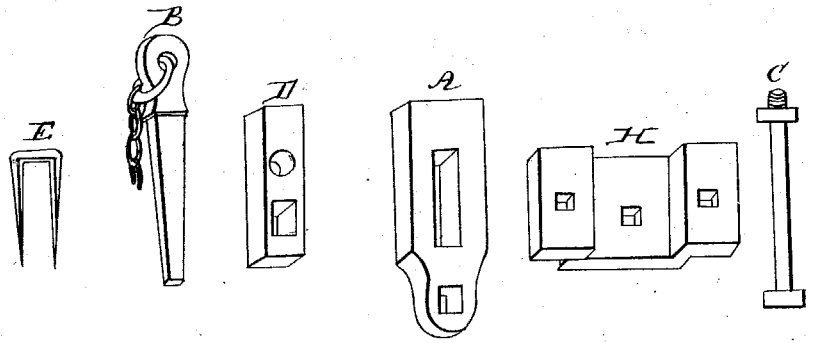
H. PETERS, PHOTO-LITHOGRAPHER, WASHINGTON, D. C.

John K Smith Port Clinton Schuylkill Penn,
(Patented February 12. 1836.)

The Schedule referred to in these Letters Patent and ma-
king part of the same, containing a description in the words
of the said John K Smith himself of his improvement, in the
fastenings for Drop Doors of Rail Road Cars. ——

To all to whom these presnce may come, Be it known that I
John K Smith of Port Clinton in the County of Schuylkill State of
Pennsylvania, have invented a new and useful fastening for securing
drop Doors on Rail Road Cars, and that the following is a full and
exact description of the same. The doors are to be hung transverse
the car, and when shut, meet at the centre, and on a level of the
under part of the longitudinal bed pieces of the car. The hinges
should curve to the corner of the doors which rest upon a bolt say
4 inches wide which is supported by a plate of iron, bent so as
to form a space for the bolt to play under the bed piece - This plate
(or support) is secured to the bed piece by 3 bolts, the middle one
passing through a long groove in the flat bolt which serves to regulate
its motion. In order more easily to draw the bolt I make use
of a top piece of iron secured to the top part of the bed piece thro
which the middle bolt passes, and by it is secured to its place.
This top piece projects over the side of the bed piece a suitable
distance to rest a hooked lever against (which I have found to
be most suitable) for drawing the bolt. A safety pin attached
to the side of the car by a chain, passes through the top piece.
A staple driven in the side of the bed piece, and a square hole
in the sliding bolt. This pin is to secure the bolt to its place. I do
not claim the arrangement of the doors, or the hinges on them,
What I claim as my own invention, is the various pieces com
posing the fastening and their general arrangement. I am aware
that the sliding bolt can be supported by other fastenings than
those described above. But as I claim the mode of securing th doors by means of a bolt secured under the bedpiece, and sliding under the doors, any other mode of securing the would be an invasion of my rights.

Witnesses
John Bond
Samuel LeRoy

John K Smith (472) (Patented 12th of February 1836)

Exd. NHC.
(Rec.d & Recorded anew Jany. 8. 1839.)